April 19, 1960 H. JACOBS 2,932,878
METHOD OF MAKING SILICON CARBIDE RECTIFIERS
Filed Sept. 4, 1958
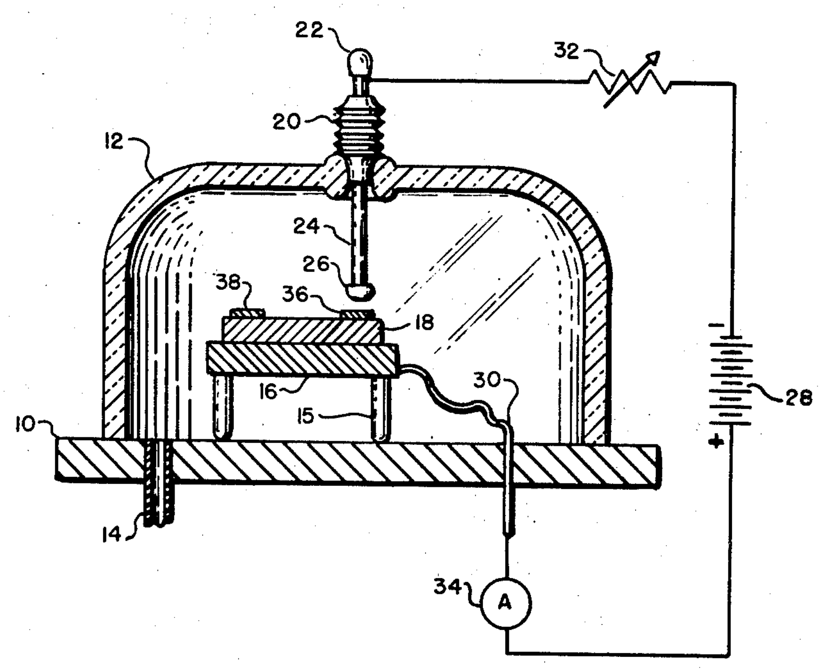
INVENTOR,
HAROLD JACOBS.
BY Harry M. Saragovitz
ATTORNEY.

United States Patent Office 2,932,878

Patented Apr. 19, 1960

2,932,878

METHOD OF MAKING SILICON CARBIDE RECTIFIERS

Harold Jacobs, West Long Branch, N.J., assignor to the United States of America as represented by the Secretary of the Army Application September 4, 1958, Serial No. 759,104

4 Claims. (Cl. 29—25.3)

(Granted under Title 35, U.S. Code (1952), sec. 266)

The invention described herein may be manufactured and used by or for the Government for governmental purposes, without the payment of any royalty thereon.

This invention relates to a method of making silicon carbide rectifiers.

In the conventional contact rectifiers, there are generally employed suitable metal electrodes and a semiconductor body of germanium or silicon. Germanium rectifiers, due to their low melting point and other physical and chemical characteristics fail to operate properly and consistently at slightly elevated temperatures (about 80° C.). Therefore much interest has been shown in the use of silicon semiconductor bodies in rectifiers, as silicon, due to its higher melting point and thermal stability, operates at temperatures up to 150° C. However, a great need exists in military and commercial use for semiconductor rectifiers that can operate at temperatures up to 600° C. For some time there has been consideration given to use of a highly refractory material such as silicon carbide as a semiconductor body for rectifiers.

Many attempts have been made to prepare rectifiers consisting of silicon carbide containing either donor or acceptor impurities. However, it has been found to be very difficult to prepare silicon carbide rectifiers which have characteristics, sufficiently satisfactory so as to make their use practicable. Two of the difficulties have been the formation of a good barrier junction for rectification purposes and of an ohmic contact.

It is accordingly a primary object of the present invention to provide a method of forming a silicon carbide rectifier.

In accordance with the present invention there is provided a method for preparing a silicon carbide wafer for alternating current rectification comprising periodically arcing a direct current of a critical amount and polarity in an inert gas atmosphere through a gold-antimony material or other metallic material and an N-type silicon carbide wafer.

For a more detailed description of the invention, together with other and further objects thereof, reference is had to the following description taken in connection with the single figure of the accompanying drawing, which is a sectional view of an apparatus for preparing a semiconductor body in accordance with a preferred embodiment of the present invention.

Semiconduction may be classified as two types, one known as conduction by electrons or the excess process of conduction and the other known as conduction by holes or the deficit process of conduction. The terms N-type and P-type are applied to semiconductive materials which tend to pass current easily when the material is biased respectively negative or positive to a conductive contact, and pass current with difficulty when the reverse biasing is applied. N-type semiconductor also specifically means that the semiconductive material contains a significant pentavalent impurity such as arsenic, antimony, bismuth and phosphorus which when present in the semiconductive material provides an excess of electrons so that conduction therein is by electrons. P-type means a semiconductive material containing a significant trivalent impurity such as boron, aluminum, gallium and indium which causes a deficiency of electrons in the material so that the conduction is by the holes, the majority carrier. N-type impurities are also known as donor impurities and P-type as acceptor impurities.

The term "barrier" or "electrical barrier" used in the description and discussion of this invention is applied to a boundary condition between adjacent semiconductors of opposite conductivity type, or between a semiconductor and a metallic conductor whereby current passes with relative ease in one direction and with relative difficulty in the other.

Referring now to the drawing, the apparatus illustrated comprises a base 10 mounting a bell jar 12, the base 10 having therein a port 14 by way of which the bell jar may be evacuated or an inert gas, for example argon, may be introduced into the bell jar 12. Affixed to the base 10 are a plurality of supports 15 which mount a movable brass platform or plate 16 upon which a wafer 18 of N-type silicon carbide semiconductive material is attached by supersonic soldering. Prior to its attachment to plate 16, a flat surface of wafer 18 is first cleaned, for example, with an acid composed of 8 parts 48% HF, 5 parts concentrated $HNO_3$ and 5 parts $CH_3COOH$. The silicon carbide wafer 18 contains a predetermined amount of significant impurity and should be relatively pure and have a resistance of about 1 ohm-centimeter. However, for the formation of a rectifier, it need not necessarily be monocrystalline, and, in addition, the resistivity range can vary broadly depending upon the intended application.

Disposed opposite base 10 and hermetically sealed to the bell jar 12, as viewed in the drawing, is a conventional sylphon bellows 20 having a knob 22 mounted thereon. A metal electrode 24 fixed to knob 22 and extending through bellows 20 and bell jar 12 is suspended above the flat surface of wafer 18. Electrode 24 may be formed of any metal having a sufficiently high melting point such as tungsten, tantalum or platinum. Tungsten is preferred since it is readily available and inexpensive. Knob 22 may be utilized to depress bellows 20 and thus raise and lower electrode 24 relative to the surface of wafer 18.

A sphere 26 of gold-antimony alloy, approximately .05 to .06 inch in diameter, is melted on the pointed end of electrode 24 or is attached thereto by dipping in a melt or by any known means, and is normally maintained about .04 inch above the flat surface of wafer 18. In alloy 26, the antimony represents only one-half atomic percent of the gold-antimony material. Electrode 24 is connected to the negative terminal of a direct current potential source 28 through a variable protective resistor 32, and wafer 18 is connected through brass platform 16 and by conductive lead 30, extending through a sealed insulated opening in base 10, to the positive terminal of the same source. An ammeter 34 is provided in the circuit to monitor the application of the proper amount of current through sphere 26 and wafer 18.

In use of the apparatus, the bell jar 12 is evacuated and an inert gas, such as argon, is introduced thereinto by way of port 14, at a pressure of about 300 millimeters of mercury. Also the variable resistor 32 is set to permit the source 28 to cause a current greater than 0.5 ampere but less than 1.0 ampere to flow when alloy 26 contacts wafer 18. Electrode 24 is then raised and lowered so that contact between wafer 18 and alloy 26 is intermittently broken, thus effecting a periodic arcing between wafer 18 and alloy 26. Preferably the making and breaking of the contact between wafer 18 and alloy 16 is at a rate of about 30 times per minute for a duration of one minute.

Following the deposition of the gold-antimony material, the wafer 18 is removed from the bell jar, allowed to cool to room temperature, water washed, and cleaned.

This process produces a barrier junction zone 36 whose area is between 1 to 3 millimeters in diameter and whose penetration into the silicon carbide is very thin, of the order of a few atomic diameters. A junction produced as described above was angle lapped and sectioned; and although the gold alloy was firmly bonded to the silicon carbide wafer, no diffusion or alloying penetration was observed under microscopic examination.

To obtain an ohmic contact zone on wafer 18, the platform 16 is moved laterally so that alloy 26 is about 4 millimeters removed from junction 36. The process is repeated as above except that resistor 32 is varied so that the direct current source 28 causes a current ranging between 1.0 and 3.0 amperes to flow through alloy 26 and wafer 18, thereby forming an ohmic contact 38 on the surface of the wafer.

As the rectifier is expected to operate at temperatures up to 600° C., a very blunt probe electrode contacts ohmic contact 38, a pointed electrode contacts rectifying junction 36 and the unit is operated as a two-electrode rectifier. In addition, metal wires can be soldered to the two gold contacts.

Experimentally, it was found that rectifying junctions and ohmic contacts were produced when the range of pressure of the inert gas was between 200 to 500 millimeters of mercury. Pressures greater than 500 millimeters of mercury resulted in unstable arcing between the alloy and the wafer, and at pressures less than 200 millimeters of mercury there was not enough power present per unit area to make a bonded contact. It was also found that when the applied current range from not less than 1.0 ampere to 5.0 amperes, i.e., higher currents, only ohmic contacts were produced. Furthermore, junctions and ohmic contacts resulted when the series of intermittent contacts between the alloy and the wafer ranged from 25 to 35 times per minute for a duration between ½ to 2 minutes, and when the alloy was suspended between .02 to .05 inch above the wafer. However, optimum results were obtained when the above variables were substantially equal to the amounts indicated in the foregoing description.

When the fabrication is performed as described, the electrical barrier junction is effected in a very short period of time and assures production of a physically and electrically uniform PN junction. The electrical characteristics were found to have the following properties: for slightly less than 1 ohm-centimeter material: Zener reverse voltage of about 8 volts; forward resistance ranging between 200 to 300 ohms; and reverse resistance of 1,500,000 ohms at 4 volts. The method, thus, enables and facilitates the economic fabrication of junctions and ohmic connections of desirable and reproducible physical and performance characteristics.

Although the invention has been described with particular reference to the production of PN junctions and ohmic contacts in N-type silicon carbide through the use of gold-antimony impurity, it may be practice also with N-type silicon carbide and other metals. In addition, the method may be practiced with other semiconductors, such as silicon, using donor or acceptor significant impurities. The process may also be used in the formation of ohmic contacts in the manufacture of semiconductor resistors.

While there has been described what is at present considered a preferred embodiment of the invention, it will be obvious to those skilled in the art that various changes and modifications may be made therein without departing from the invention, and it is therefore aimed in the appended claims to cover all such changes and modification as fall within the spirit and scope of the invention.

What is claimed is:

1. The process of manufacturing an N-type silicon carbide rectifier, comprising mounting an N-type silicon carbide wafer having a bulk resistivity of about 1 ohm-centimeter in an inert gas atmosphere of about 300 millimeters of mercury, suspending a tungsten electrode coated with gold-antimony alloy about .04 inch above a surface of said wafer, applying a direct current potential between said electrode and said wafer, said electrode being negatively biased relative to said wafer, making and breaking contact of said electrode and said wafer while applying a current greater than 0.5 ampere but less than 1.0 ampere to form intermittent arcs between said electrode and said wafer at a rate of about 30 times per minute for a duration of one minute to produce a rectifying junction on the surface of said wafer, laterally moving said wafer relative to said electrode about 4 millimeters from said junction, then again repeating the above operation with a current between 1.0 and 3.0 amperes to produce an ohmic contact on the surface of said wafer, and gradually cooling said wafer.

2. The method of preparing an N-type silicon carbide wafer having a bulk resistivity of about 1 ohm-centimeter for use as an alternating current rectifier, comprising mounting said wafer in an inert gas atmosphere ranging between 200 to 500 millimeters of mercury, suspending a metal electrode coated with gold-antimony alloy between .02 to .05 inch above a surface of said wafer, applying a direct current potential between said electrode and said wafer, said electrode being negatively biased relative to said wafer, making and breaking contact of said electrode and said wafer while applying a current between 0.5 and 5.0 amperes to form intermittent arcs between said electrode and said wafer at a rate ranging from 25 to 35 times per minute for a duration between ½ to 2 minutes, and gradually cooling said wafer.

3. The method of preparing a rectifying junction to an N-type silicon carbide wafer having a bulk resistivity of about 1 ohm-centimeter, comprising mounting said wafer in an inert gas atmosphere of about 300 millimeters of mercury, suspending a tungsten electrode coated with gold-antimony about .04 inch above a surface of said wafer, applying a direct current potential between said electrode and said wafer, said electrode being negatively biased relative to said wafer, making and breaking contact of said electrode and said wafer while applying a current greater than 0.5 ampere but less than 1.0 ampere to form intermittent arcs between said electrode and said wafer at a rate of about 30 times per minute for a duration of one minute, and gradually cooling said wafer.

4. The method of preparing an ohmic contact to an N-type silicon carbide wafer having a bulk resistivity of about 1 ohm-centimeter, comprising mounting said wafer in an inert gas atmosphere of about 300 millimeters of mercury, suspending a tungsten electrode coated with gold-antimony alloy about .04 inch above a surface of said wafer, applying a direct current potential between said electrode and said wafer, said electrode being negatively biased relative to said wafer, making and breaking contact of said electrode and said wafer while applying a current between 1.0 and 3.0 amperes to form intermittent arcs between said electrode and said wafer at a rate of about 30 times per minute for a duration of one minute, and gradually cooling said wafer.

References Cited in the file of this patent

UNITED STATES PATENTS

| | | |
|---|---|---|
| 2,793,332 | Alexander et al. | May 21, 1957 |
| 2,854,362 | Brand et al. | Sept. 30, 1958 |